(12) United States Patent
Webb et al.

(10) Patent No.: US 12,320,287 B2
(45) Date of Patent: *Jun. 3, 2025

(54) HEATER CONTROL IN HEAVY-DUTY MOTOR VEHICLE ENGINES

(71) Applicant: PACCAR Inc, Bellevue, WA (US)

(72) Inventors: Cynthia Chaffin Webb, Sedro-Woolley, WA (US); Charles Wayne Reinhardt Swart, Bellingham, WA (US); Maarten Meijer, Anacortes, WA (US); Varun Ramesh, Bellingham, WA (US); John Lahti, Anacortes, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,846

(22) Filed: Sep. 9, 2024

(65) Prior Publication Data

US 2025/0092809 A1    Mar. 20, 2025

Related U.S. Application Data

(63) Continuation of application No. 18/343,660, filed on Jun. 28, 2023, now Pat. No. 12,085,001, which is a
(Continued)

(51) Int. Cl.
  *F01N 3/20*    (2006.01)
  *F01N 3/035*   (2006.01)
  *F01N 3/28*    (2006.01)

(52) U.S. Cl.
  CPC .......... *F01N 3/2066* (2013.01); *F01N 3/035* (2013.01); *F01N 3/2892* (2013.01);
  (Continued)

(58) Field of Classification Search
  CPC ...... F01N 3/2066; F01N 3/035; F01N 3/2892; F01N 2240/20; F01N 2570/14; F01N 2610/02; F01N 2610/146
  See application file for complete search history.

(56) References Cited

U.S. PATENT DOCUMENTS 5,570,576 A  *  11/1996  Ament ................. F01N 3/2033
                                                  60/303
5,588,291 A     12/1996  Maus et al.
(Continued)

FOREIGN PATENT DOCUMENTS

CN    106246301 B      7/2019
DE  10 2010 034707 A1  2/2012
(Continued)

*Primary Examiner* — Matthew T Largi
(74) *Attorney, Agent, or Firm* — Seed IP Law Group LLP

(57) ABSTRACT

A heavy duty truck includes a diesel engine that generates an exhaust gas flow and an exhaust after-treatment system for treatment of the exhaust gas flow. The exhaust after-treatment system includes at least one heater and at least one selective catalytic reduction system downstream of the heater. The heater is operated to inject supplemental heat energy into the exhaust gas flow at a rate based on a difference between a target rate of heat energy in the exhaust gas flow at an inlet to the selective catalytic reduction system and a rate of heat energy supplied to the exhaust gas flow from the diesel engine.

19 Claims, 3 Drawing Sheets

Related U.S. Application Data continuation of application No. 17/002,511, filed on Aug. 25, 2020, now Pat. No. 11,725,560.

(60) Provisional application No. 63/057,090, filed on Jul. 27, 2020, provisional application No. 63/056,131, filed on Jul. 24, 2020, provisional application No. 63/054,468, filed on Jul. 21, 2020.

(52) U.S. Cl.
CPC ...... *F01N 2240/20* (2013.01); *F01N 2570/14* (2013.01); *F01N 2610/02* (2013.01); *F01N 2610/146* (2013.01)

(56) References Cited

U.S. PATENT DOCUMENTS

| | | | |
|---|---|---|---|
| 5,600,947 A * | 2/1997 | Cullen | F01N 11/00 60/284 |
| 5,787,705 A | 8/1998 | Thoreson | |
| 8,778,290 B1 | 7/2014 | Ren et al. | |
| 8,818,691 B2 * | 8/2014 | Douglas | F02D 41/024 123/676 |
| 10,161,276 B2 | 12/2018 | Miao et al. | |
| 10,690,033 B1 | 6/2020 | Johnson et al. | |
| 10,753,255 B2 | 8/2020 | Schweizer | |
| 10,760,513 B1 | 9/2020 | Huhn et al. | |
| 10,808,594 B2 | 10/2020 | Dimoski et al. | |
| 10,920,641 B2 | 2/2021 | Kinnaird et al. | |
| 11,035,274 B2 | 6/2021 | Johansson et al. | |
| 11,181,026 B1 | 11/2021 | Webb et al. | |
| 2004/0128983 A1 | 7/2004 | Okada et al. | |
| 2006/0153761 A1 | 7/2006 | Bandl-Konrad et al. | |
| 2007/0079605 A1 | 4/2007 | Hu et al. | |
| 2007/0082783 A1 | 4/2007 | Hu et al. | |
| 2007/0122317 A1 | 5/2007 | Driscoll et al. | |
| 2007/0193253 A1 | 8/2007 | Tsumagari | |
| 2008/0072575 A1 | 3/2008 | Yan | |
| 2008/0243358 A1 | 10/2008 | Kojima et al. | |
| 2008/0295493 A1 * | 12/2008 | Applegate | F01N 3/2013 60/286 |
| 2009/0035194 A1 | 2/2009 | Robel et al. | |
| 2009/0158706 A1 | 6/2009 | Sun | |
| 2009/0183501 A1 | 7/2009 | Gonze et al. | |
| 2010/0242440 A1 | 9/2010 | Garimella et al. | |
| 2011/0000194 A1 | 1/2011 | Gonze et al. | |
| 2011/0047964 A1 | 3/2011 | Yezerets et al. | |
| 2011/0061372 A1 | 3/2011 | Levijoki et al. | |
| 2011/0265452 A1 | 11/2011 | Geveci et al. | |
| 2011/0271660 A1 | 11/2011 | Gonze et al. | |
| 2012/0085082 A1 | 4/2012 | Levijoki et al. | |
| 2013/0146024 A1 | 6/2013 | Cunningham et al. | |
| 2013/0232958 A1 | 9/2013 | Ancimer et al. | |
| 2013/0311065 A1 | 11/2013 | Sun et al. | |
| 2014/0033683 A1 | 2/2014 | Wei et al. | |
| 2014/0363358 A1 | 12/2014 | Udd et al. | |
| 2015/0023853 A1 | 1/2015 | Wittrock et al. | |
| 2015/0040540 A1 | 2/2015 | Hulser et al. | |
| 2015/0040543 A1 | 2/2015 | Shetney et al. | |
| 2015/0096287 A1 | 4/2015 | Qi | |
| 2015/0151251 A1 | 6/2015 | Gaudin | |
| 2015/0247435 A1 | 9/2015 | Garimella et al. | |
| 2015/0275730 A1 | 10/2015 | Gupta et al. | |
| 2015/0276694 A1 | 10/2015 | Lahr | |
| 2015/0314239 A1 | 11/2015 | Kawaguchi et al. | |
| 2015/0337702 A1 | 11/2015 | Ettireddy et al. | |
| 2016/0032803 A1 | 2/2016 | Ettireddy et al. | |
| 2016/0186629 A1 | 6/2016 | Osburn et al. | |
| 2016/0186630 A1 | 6/2016 | Osburn et al. | |
| 2016/0346732 A1 | 12/2016 | Schmitt et al. | |
| 2017/0051654 A1 | 2/2017 | Gupta et al. | |
| 2017/0114690 A1 | 4/2017 | Gupta et al. | |
| 2017/0122159 A1 | 5/2017 | Bahrami | |
| 2017/0130629 A1 | 5/2017 | Nagel et al. | |
| 2017/0167342 A1 | 6/2017 | Balthes | |
| 2017/0175604 A1 | 6/2017 | Devarakonda et al. | |
| 2017/0234199 A1 | 8/2017 | Sun et al. | |
| 2017/0306819 A1 | 10/2017 | Alfieri et al. | |
| 2018/0080359 A1 | 3/2018 | Price et al. | |
| 2018/0087426 A1 | 3/2018 | Dou et al. | |
| 2018/0163589 A1 | 6/2018 | David et al. | |
| 2018/0230879 A1 | 8/2018 | Saitoh et al. | |
| 2018/0252136 A1 | 9/2018 | Concetto Pesce et al. | |
| 2018/0274420 A1 | 9/2018 | Kleinknecht et al. | |
| 2018/0274421 A1 | 9/2018 | Smith et al. | |
| 2018/0334939 A1 | 11/2018 | Mital et al. | |
| 2018/0345217 A1 | 12/2018 | Goffe | |
| 2018/0345218 A1 | 12/2018 | Goffe | |
| 2019/0078481 A1 | 3/2019 | Schweizer | |
| 2019/0136732 A1 | 5/2019 | Lauritano et al. | |
| 2019/0155230 A1 | 5/2019 | Culbertson et al. | |
| 2019/0234367 A1 | 8/2019 | Pursifull et al. | |
| 2019/0345861 A1 | 11/2019 | Johansson et al. | |
| 2019/0353071 A1 | 11/2019 | Camuglia et al. | |
| 2019/0360415 A1 * | 11/2019 | Romanato | F02D 41/405 |
| 2019/0383189 A1 | 12/2019 | Dou et al. | |
| 2020/0063634 A1 | 2/2020 | Smith et al. | |
| 2020/0316571 A1 | 10/2020 | Goffe | |
| 2020/0332691 A1 | 10/2020 | Soeger et al. | |
| 2021/0079826 A1 | 3/2021 | Voss et al. | |
| 2021/0095590 A1 | 4/2021 | Bastoreala et al. | |
| 2022/0010713 A1 | 1/2022 | McCarthy, Jr. et al. | |
| 2022/0025805 A1 * | 1/2022 | Webb | F01N 3/027 |

FOREIGN PATENT DOCUMENTS

| | | |
|---|---|---|
| DE | 102018101929 A1 | 8/2019 |
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A1 | 10/2009 |
| WO | WO 2014032686 A1 | 3/2014 |

* cited by examiner

HEATER CONTROL IN HEAVY-DUTY MOTOR VEHICLE ENGINES

CROSS-REFERENCE TO RELATED APPLICATIONS

This application is a continuation of U.S. patent application Ser. No. 18/343,660, filed Jun. 28, 2023, which is a continuation of U.S. patent application Ser. No. 17/002,511, filed Aug. 25, 2020, now U.S. Pat. No. 11,725,560, which claims the benefit of U.S. Provisional Patent Application No. 63/057,090, filed Jul. 27, 2020, U.S. Provisional Patent Application No. 63/056,131, filed Jul. 24, 2020, and U.S. Provisional Patent Application No. 63/054,468, filed Jul. 21, 2020, the entire contents of all of the foregoing hereby incorporated by reference.

BACKGROUND

Technical Field

The present disclosure relates generally to energy-based electric heater control in heavy-duty motor vehicle engines and to modulation of performance of heaters in heavy-duty motor vehicle exhaust after-treatment systems.

Description of the Related Art

Regulated emissions from today's heavy-duty engines demand very low levels of tailpipe emissions, and standards are expected to be further reduced in the near future. To reduce tailpipe exhaust emissions, current technologies rely on aggressive engine control strategies and exhaust after-treatment catalyst systems (catalyst systems used to treat engine exhaust are referred to herein as exhaust after-treatment systems, emissions after-treatment systems, or EAS). The EAS for a typical heavy-duty diesel or other lean-burning engine may include a diesel oxidation catalyst (DOC) to oxidize unburned fuel and carbon monoxide, a diesel particulate filter (DPF) for control of particulate matter (PM), selective catalytic reduction (SCR) systems for reduction of oxides of nitrogen ($NO_x$), and/or an ammonia oxidation catalyst (AMOX). Performance of EAS systems, and of SCR systems in particular, is dependent upon exhaust gas temperature and other parameters.

SCR processes use catalysts to catalyze the $NO_x$ reduction and a fluid referred to as DEF (diesel emission fluid), which acts as a $NO_x$ reductant over the SCR catalyst. DEF is an aqueous solution that evaporates and decomposes to chemically release ammonia so that the ammonia is available for reaction. Efficiency of SCR operation is dependent upon temperature. For example, DEF evaporation and decomposition is dependent upon temperature, with higher temperatures (e.g., temperatures over 150, 160, 170, 180, 190, 200, 250, 300, or 350 degrees Celsius) generally improving performance. Temperature levels required to ensure compliance with emissions regulations may be highly dependent upon a wide variety of variables and are in some cases determined experimentally for specific engines, trucks, and operating conditions thereof. Thus, an EAS may include a heater to increase the temperature of the exhaust, to facilitate DEF injection, evaporation, and decomposition at rates sufficient to allow efficient performance of the SCR processes.

BRIEF SUMMARY

A method may be summarized as comprising: operating a diesel engine of a heavy-duty truck such that the diesel engine generates an exhaust gas flow; and while operating the diesel engine, operating an exhaust after-treatment system of the heavy-duty truck to maintain a temperature of the exhaust gas flow at a selective catalytic reduction system of the exhaust after-treatment system at a constant target temperature; wherein operating the exhaust after-treatment system to maintain the temperature at the constant target temperature includes calculating a rate at which heat energy is provided from the diesel engine to the exhaust gas flow, calculating a target rate of heat energy for the exhaust gas flow at the selective catalytic reduction system based on the constant target temperature, calculating a rate at which to provide supplemental heat energy from a heater of the exhaust after-treatment system to the exhaust gas flow based on the calculated rate at which heat energy is provided from the diesel engine to the exhaust gas flow and the calculated target rate of heat energy, and operating the heater to provide supplemental heat energy to the exhaust gas flow at the calculated rate.

The constant target temperature may be at least 200 degrees Celsius. Calculating the rate at which heat energy is provided from the diesel engine to the exhaust gas flow may include averaging a product of a temperature of the exhaust gas flow as it enters the exhaust after-treatment system, a mass flow rate of the exhaust gas flow, and a molar specific heat of the exhaust gas flow across a moving average window of time. Calculating the target rate of heat energy for the exhaust gas flow at the selective catalytic reduction system may include averaging a product of the target temperature, a mass flow rate of the exhaust gas flow, and a molar specific heat of the exhaust gas flow across a moving average window of time. Calculating the rate at which to provide supplemental heat energy from the heater may include subtracting the calculated rate at which heat energy is provided from the diesel engine to the exhaust gas flow from the calculated target rate of heat energy.

The method may further comprise: measuring a first temperature of the exhaust gas flow upstream of the heater; measuring a second temperature of the exhaust gas flow downstream of the heater; measuring a current drawn by the heater; calculating an electric current to be supplied to the heater based on the measurements of the first temperature, the second temperature, and the drawn current, and the calculated rate at which to provide supplemental heat energy from the heater to the exhaust gas flow; and supplying the calculated electric current to the heater. Calculating the electric current to be supplied may include calculating an electric resistance of the electric heater. The method may further comprise detecting a failure of the heater based on the calculated electric resistance. Calculating the electric resistance of the electric heater may include dividing a rate at which the heater delivers energy to the exhaust gas flow by a square of the current drawn by the heater. Calculating the electric current may further include taking a square root of a ratio of the calculated rate at which the heater is to provide supplemental heat energy to the exhaust gas flow to the calculated resistance of the heater.

A method may be summarized as comprising: operating a diesel engine of a heavy-duty truck such that the diesel engine generates an exhaust gas flow; and while operating the diesel engine, operating an exhaust after-treatment system of the heavy-duty truck to increase a temperature of a catalytic bed of a selective catalytic reduction system of the exhaust after-treatment system; and while operating the diesel engine and after increasing the temperature of the catalytic bed of the selective catalytic reduction system, operating the exhaust after-treatment system to maintain a temperature of the exhaust gas flow at the selective catalytic reduction system at a constant target temperature; wherein operating the exhaust after-treatment system to increase the temperature of the catalytic bed of the selective catalytic reduction system includes calculating a first rate at which heat energy is provided from the diesel engine to the exhaust gas flow, calculating a first target rate of heat energy for the exhaust gas flow at the selective catalytic reduction system based on the constant target temperature, calculating a first rate at which to provide supplemental heat energy from a heater of the exhaust after-treatment system to the exhaust gas flow to maintain the temperature at the constant target temperature based on the calculated first rate at which heat energy is provided from the diesel engine to the exhaust gas flow and the calculated first target rate of heat energy, and operating the heater to provide supplemental heat energy to the exhaust gas flow at a rate exceeding the calculated first rate; wherein operating the exhaust after-treatment system to maintain the temperature at the constant target temperature includes calculating a second rate at which heat energy is provided from the diesel engine to the exhaust gas flow, calculating a second target rate of heat energy for the exhaust gas flow at the selective catalytic reduction system based on the constant target temperature, calculating a second rate at which to provide supplemental heat energy from a heater of the exhaust after-treatment system to the exhaust gas flow to maintain the temperature at the constant target temperature based on the calculated second rate at which heat energy is provided from the diesel engine to the exhaust gas flow and the calculated second target rate of heat energy, and operating the heater to provide supplemental heat energy to the exhaust gas flow at the calculated second rate.

Operating the exhaust after-treatment system to increase the temperature of the catalytic bed of the selective catalytic reduction system may include initiating operation of the exhaust after-treatment system to increase the temperature of the catalytic bed of the selective catalytic reduction system upon determining that a temperature of an engine coolant is below a threshold temperature. The threshold temperature may be a target steady state temperature for the engine coolant.

Operating the exhaust after-treatment system to increase the temperature of the catalytic bed of the selective catalytic reduction system may include halting operation of the exhaust after-treatment system to increase the temperature of the catalytic bed of the selective catalytic reduction system upon determining that a temperature of an engine coolant is above a threshold temperature. The threshold temperature may be a target steady state temperature for the engine coolant. Operating the heater to provide supplemental heat energy to the exhaust gas flow at the rate exceeding the calculated first rate may include operating the heater to provide supplemental heat energy to the exhaust gas flow at the rate exceeding the calculated first rate until a total heat energy delivered to the exhaust gas flow by both the diesel engine and the heater exceeds a total heat energy required to be delivered to the exhaust gas flow by both the diesel engine and the heater to raise the temperature of the catalytic bed of the selective catalytic reduction system by a target temperature difference. The total heat energy required to be delivered to the exhaust gas flow by both the diesel engine and the heater to raise the temperature of the catalytic bed of the selective catalytic reduction system by the target temperature difference may be between 25 MJ and 30 MJ. Operating the heater to provide supplemental heat energy to the exhaust gas flow at the rate exceeding the calculated first rate may include operating the heater at greater than 99% of its maximum capacity.

A heavy-duty truck may be summarized as comprising: a diesel engine; an exhaust after-treatment system having an upstream end and a downstream end opposite the upstream end, the upstream end coupled to the diesel engine, the exhaust after-treatment system including a heater and a selective catalytic reduction system downstream of the heater; and an engine control unit configured to: operate the diesel engine such that the diesel engine generates an exhaust gas flow; and while operating the diesel engine, operate the heater to maintain a temperature of the exhaust gas flow at the selective catalytic reduction system at a constant target temperature; wherein operating the heater to maintain the temperature at the constant target temperature includes calculating a rate at which heat energy is provided from the diesel engine to the exhaust gas flow, calculating a target rate of heat energy for the exhaust gas flow at the selective catalytic reduction system based on the constant target temperature, calculating a rate at which to provide supplemental heat energy from the heater to the exhaust gas flow based on the calculated rate at which heat energy is provided from the diesel engine to the exhaust gas flow and the calculated target rate of heat energy, and operating the heater to provide supplemental heat energy to the exhaust gas flow at the calculated rate. The selective catalytic reduction system may be a close-coupled selective catalytic reduction system.

DETAILED DESCRIPTION

Figure 1:
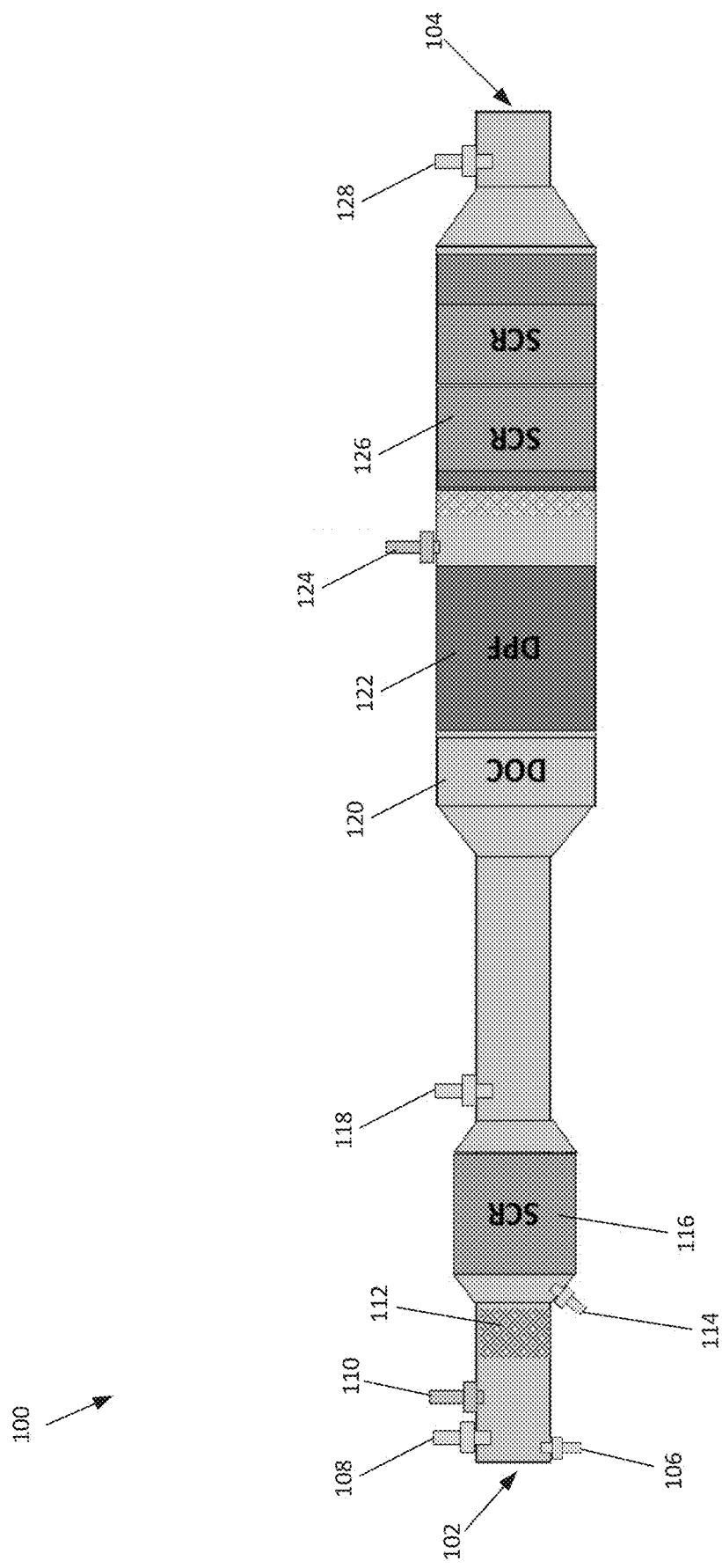
FIG. 1 illustrates a diagram of an exhaust after-treatment system including a DOC, a DPF, and dual SCR systems.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

As described herein, experiments may be performed and measurements may be taken while an engine or a vehicle including an engine are operating at "steady state." As used herein, the term "steady state" may mean that the engine or the vehicle including the engine are operating with all operating parameters, including engine speed, power level, etc., unchanged or substantially unchanged over a period of time of at least one, at least two, at least three, at least four, at least five, at least six, or at least ten seconds.

Traditionally, heavy-duty vehicles included many components of exhaust after-treatment systems "underbody," that is, underneath the engine, cab, or another portion of the vehicle, where space is relatively freely available and these components can therefore generally be larger than would otherwise be practical. Some modern heavy-duty vehicles, however, have begun to include a "close-coupled," "up-close," or "light-off" SCR unit much closer to the engine and exhaust ports thereof (e.g., adjacent to a turbine outlet of a turbocharger) and upstream of the traditional underbody exhaust after-treatment system, which can provide certain advantages in that the temperature of the engine exhaust may be higher when it is closer to the engine, although locating an SCR unit nearer the engine limits the available space and thus its practical size. Thus, some modern heavy-duty vehicles have included both a "close-coupled" SCR unit upstream with respect to the flow of the exhaust, such as adjacent to a turbine outlet of a turbocharger, to take advantage of the higher exhaust temperatures, as well as an "underbody" SCR unit downstream with respect to the flow of the exhaust, such as under the engine or cab of the vehicle, to take advantage of the greater available space.

FIG. 1 illustrates a diagram of an exhaust after-treatment system 100 that has a first, upstream end 102 and a second, downstream end 104 opposite to the first, upstream end 102. The exhaust after-treatment system 100 is a component of a vehicle, such as a large, heavy-duty, diesel truck, and in use carries exhaust from the diesel engine of the truck to a tailpipe of the truck. For example, the first, upstream end 102 of the exhaust after-treatment system 100 may be coupled directly to an exhaust port or an outlet port of the diesel engine, such as a turbine outlet of a turbocharger thereof, and the second, downstream end 104 may be coupled directly to an inlet port of a tailpipe or muffler of the truck. Thus, when the engine is running and generating exhaust, the exhaust travels along the length of the exhaust after-treatment system 100 from the first, upstream end 102 thereof to the second, downstream end 104 thereof.

As illustrated in FIG. 1, the exhaust after-treatment system 100 includes, at its first, upstream end 102, or proximate or adjacent thereto, a first temperature sensor 106, which may be a thermocouple, to measure the temperature of the exhaust gas flow as it leaves the engine and enters the exhaust after-treatment system 100, before heat begins to be lost through the exhaust after-treatment system 100 to the environment. The exhaust after-treatment system 100 also includes, at its first, upstream end 102, or proximate or adjacent thereto, or just downstream of the first temperature sensor 106, a first $NO_x$ sensor 108, to measure the content of $NO_x$ gases in the exhaust gas flow as it leaves the engine and enters the exhaust after-treatment system 100. The exhaust after-treatment system 100 also includes, at its first, upstream end 102, or proximate or adjacent thereto, or just downstream of the first $NO_x$ sensor 108, a first DEF injector 110, to inject DEF into the exhaust gas flow as it leaves the engine and enters the exhaust after-treatment system 100.

The exhaust after-treatment system 100 also includes, proximate or adjacent its first, upstream end 102, or just downstream of the first DEF injector 110, a heater 112, which may be an electrically-powered resistive heater or heating element, a burner, or any other suitable heater, to inject heat energy into the exhaust gas flow and the injected DEF as they flow through the exhaust after-treatment system 100. The exhaust after-treatment system 100 also includes, just downstream of the heater 112, a second temperature sensor 114, which may be a thermocouple, to measure the temperature of the exhaust gas flow as it leaves the heater 112 and just before or just as it enters a first, close-coupled SCR system 116, or at the inlet to the close-coupled SCR system 116. The exhaust after-treatment system 100 also includes, just downstream of the heater 112 and the second temperature sensor 114, the first, close-coupled SCR system 116, which is configured to reduce oxides of nitrogen ($NO_x$) in the exhaust gas flow.

The exhaust after-treatment system 100 also includes, just downstream of the first SCR system 116, a second $NO_x$ sensor 118, to measure the content of $NO_x$ gases in the exhaust gas flow as it leaves the first SCR system 116. In practice, the first $NO_x$ sensor 108 and the second $NO_x$ sensor 118 can be used together to monitor, assess, or measure the performance of the first SCR system 116. Together, the first temperature sensor 106, the first $NO_x$ sensor 108, the first DEF injector 110, the heater 112, the second temperature sensor 114, the first, close-coupled SCR system 116, and the second $NO_x$ sensor 118 can be referred to as a close-coupled portion of the exhaust after-treatment system 100, as they can be collectively located at or adjacent to the engine of the vehicle.

The exhaust after-treatment system 100 also includes, downstream of the first SCR system 116 and the second NO$_x$ sensor 118, a DOC component 120, to oxidize unburned fuel and carbon monoxide in the exhaust gas flow. The exhaust after-treatment system 100 also includes, downstream of the DOC component 120, a DPF 122, to reduce or otherwise control particulate matter in the exhaust gas flow. The exhaust after-treatment system 100 also includes, downstream of the DPF 122, a second DEF injector 124, to inject DEF into the exhaust gas flow as it leaves the DPF 122. The exhaust after-treatment system 100 also includes, downstream of the second DEF injector 124, a second, underbody SCR system 126, which is configured to reduce oxides of nitrogen (NO$_x$) in the exhaust gas flow. The exhaust after-treatment system 100 also includes, just downstream of the second SCR system 126 and at its second, downstream end 104, or proximate or adjacent thereto, a third NO$_x$ sensor 128, to measure the content of NO$_x$ gases in the exhaust gas flow as it leaves the second SCR system 126.

In practice, the second NO$_x$ sensor 118 and the third NO$_x$ sensor 128 can be used together to monitor, assess, or measure the performance of the second SCR system 126. Together, the DOC component 120, the DPF 122, the second DEF injector 124, the second SCR system 126, and the third NO$_x$ sensor 128 can be referred to as an underbody portion of the exhaust after-treatment system 100, as they can be collectively located underneath the engine, cab, or another portion of the vehicle.

As noted previously, performance of exhaust after-treatment systems, and of SCR systems in particular, is dependent upon exhaust gas temperature. More specifically, DEF evaporation and decomposition is dependent upon temperature, with higher temperatures generally improving performance. Thus, operation of a heater to increase the temperature of the exhaust gas flow can be critical to maintaining compliance with emissions regulations. Nevertheless, operation of a heater to increase the temperature of the exhaust gas flow naturally incurs a fuel penalty and thus a reduction of overall system fuel efficiency. Thus, it is critical to ensure accurate and precise performance of such heaters, to ensure compliance with emissions standards without unduly reducing overall fuel efficiency.

It has been found that the performance of heaters used in exhaust after-treatment systems degrades over time, due to a variety of factors such as aging, abuse through overheating, and/or failure of other components, including fuel injectors. Thus, in order to ensure that such heaters are performing adequately, that is, heating exhaust gas flow temperatures to within acceptable temperature ranges, the importance of monitoring heater performance has now been recognized.

First, an initial lookup table or database is built or populated under ideal or idealized conditions in accordance with standardized laboratory experiments. Such experiments may operate a heavy-duty diesel engine at steady state under a variety of operating conditions to determine properties of the exhaust gas flow generated by the engine at steady state under such conditions. For example, for each set of given operating conditions, the experiments may measure a mass flow rate ($\dot{m}_{exh}$) of the exhaust gas flow generated by the engine, which may be specified in units such as kg/s, determine a resulting molar specific heat at constant pressure ($C_p$) of the exhaust gas flow generated by the engine (which may be unique to each individual engine but may be expected to be constant over the range of operation of any given engine), and measure a resulting exhaust temperature ($T_1$) of the exhaust gas flow generated by the engine immediately adjacent to an exhaust port or outlet port of the engine itself, such as a turbine outlet of a turbocharger thereof, which may be measured by the first temperature sensor 106 and may be specified in units such as K or degrees Celsius.

From such data, the experiments may determine a resulting exhaust energy provided per unit time directly from the diesel engine itself and apart from any energy provided in the form of heat energy by the heater 112, in units such as W. To determine such resulting exhaust energy under the given operating conditions of the engine, a product of the mass flow rate ($\dot{m}_{exh}$), the molar specific heat at constant pressure ($C_p$), and the exhaust temperature ($T_1$) of the exhaust gas flow, as measured by the first temperature sensor 106, can be calculated. The resulting determined or calculated exhaust energy (in units of power) can be stored in the lookup table or database.

As another example, the experiments may also measure the total amount of energy input needed to be delivered to the exhaust gas flow, from both the diesel engine and the heater 112, in order to raise a mid-bed temperature of a catalytic bed of the first, close-coupled SCR 116 from baseline or ambient temperatures to the desired or target temperatures discussed herein. Target temperatures may be discussed herein as relating specifically to temperatures at an inlet to the close-coupled SCR 116, at least because measuring such temperatures is generally relatively straightforward compared to measuring mid-bed temperatures, but may be used as proxies for target mid-bed temperatures for a catalytic bed of the close-coupled SCR 116. In one example, it may be determined that raising the temperature of a catalytic bed of the close-coupled SCR 116 from ambient temperature to a target temperature such as 200 degrees Celsius requires an input of at least 20 MJ or 25 MJ, and/or less than 30 MJ or 35 MJ, or 27 MJ of combined energy provided by both the diesel engine and the heater 112. The resulting total energy value (in units of energy) can be stored in the lookup table or database.

Second, during operation of a vehicle, such as a motor vehicle such as a heavy-duty diesel truck, the exhaust after-treatment system 100, including the heater 112, may be operated to ensure that the temperature of the exhaust gas flow entering the first, close-coupled SCR system 116, at the inlet thereof, is at a target temperature (such a target temperature may in some cases be a proxy for a desired bed temperature of the first, close-coupled SCR system 116), where the target temperature is known or determined in advance to ensure effective operation of the SCR system while minimizing an incurred fuel penalty, as described elsewhere herein. For example, the target temperature may be selected to ensure adequate DEF evaporation and decomposition, and may be at least 150, 160, 170, 180, 190, or 200 degrees Celsius, and/or no more than 160, 170, 180, 190, 200, or 210 degrees Celsius.

For example, an Engine Control Unit ("ECU") of the truck may measure or continuously monitor a current mass flow rate ($\dot{m}_{exh}$) of the exhaust gas flow generated by the engine, which may be specified in units such as kg/s, and a resulting current exhaust temperature ($T_1$) of the exhaust gas flow generated by the engine immediately adjacent to an exhaust port or outlet port of the engine itself, such as a turbine outlet of a turbocharger thereof, which may be measured by the first temperature sensor 106 and may be specified in units such as K or degrees Celsius, and which under steady state operation may generally be at around 275 degrees Celsius. The engine control unit of the truck may also continually calculate a target energy rate or level (in units of power) for the exhaust gas flow at the inlet to the first, close-coupled SCR system 116, such as by averaging a product of the target temperature, the current mass flow rate, and the molar specific heat of the exhaust gas flow (as determined, for example, in the laboratory experiments described herein and/or stored in the lookup table or database described herein) across a moving average window of time.

The engine control unit may further continuously monitor whether current operating parameters of the heavy duty truck or the diesel engine thereof are suitable for use of the techniques described herein. For example, the engine control unit may monitor whether the diesel engine is running at a rate exceeding a threshold engine speed, such as 500, 550, or 600 rpm, whether the current mass flow rate exceeds a threshold mass flow rate, whether the engine control unit is receiving sensor signals indicative of any of the measurements described herein at a rate that exceeds a threshold rate, such as once every 25, 50, or 100 milliseconds, and whether each of such parameters has met the threshold criteria for at least a specified threshold period of time, such as one, two, or five seconds. If the engine control unit determines that such criteria have been met, then the engine control unit may proceed to perform the other actions or methods described herein. If, on the other hand, the engine control unit determines that such criteria have not been met, then the engine control unit may refrain from taking further action until it determines that the criteria have been met.

As the truck and its engine and its engine control unit are operating in this manner, the engine control unit can continually calculate a rate at which exhaust heat energy is provided directly from the diesel engine itself and apart from any energy provided by the heater 112, such as by averaging a product of the current exhaust temperature ($T_1$), as measured by the first temperature sensor 106, the current mass flow rate, and the molar specific heat of the exhaust gas flow across a moving average window of time. The engine control unit can then calculate or determine operational parameters for the heater 112, such as a rate or level of supplemental heat energy (in units of power) to be provided to the exhaust gas flow by the heater 112, based at least in part on a difference between the current rate or level of exhaust energy (in units of power) provided directly from the diesel engine itself to the exhaust gas flow and the target energy rate or level (in units of power) for the exhaust gas flow at the inlet to the first, close-coupled SCR system 116. The engine control unit can then operate the heater 112 to provide supplemental heat energy to the exhaust gas flow at a rate based at least in part on such a calculation or determination, such as at a rate equal to the target energy rate minus the rate of energy provided directly by the diesel engine itself.

In some implementations, such as when the truck and its engine are starting up or otherwise colder than when at steady state in normal operation, the engine control unit can operate the heater 112 to provide additional supplemental heat energy to the exhaust gas flow, such as to accelerate the heating of the components of the exhaust after-treatment system 100, including the close-coupled SCR system 116 and a catalytic bed therein, so that steady state temperatures are reached or achieved more quickly. Such implementations may allow operation of the first DEF injector 110, that is, DEF dosing or injection of DEF by the first DEF injector 110, earlier than otherwise, and therefore also allows efficient operation of the close-coupled SCR system 116 to reduce NO levels earlier than otherwise. Such implementations may be referred to as "cold compensation" or "warm-up compensation."

For example, the engine control unit may continually monitor a temperature of an engine coolant circulating through the diesel engine of the heavy-duty motor vehicle. The engine control unit may further continually compare the present engine coolant temperature to a threshold temperature value and determine whether the present coolant temperature is less than the threshold temperature. In some implementations, the threshold temperature may be a desired or target steady state temperature of the engine coolant. If the engine control unit determines that the present coolant temperature is less than the threshold temperature, which may serve as a proxy for determining that the vehicle and the engine are starting up, or that the vehicle, the engine, and the exhaust after-treatment system 100 (including the close-coupled SCR 116 and a catalytic bed thereof) are otherwise below steady state temperatures and therefore need to receive excess heat energy to reach steady state temperatures, then the engine control unit can initiate performance of a cold compensation operation. If, on the other hand, the engine control unit determines that the present coolant temperature is equal to or greater than the threshold temperature, then the engine control unit can stop or halt performance of the cold compensation operation.

Upon initiation of performance of a cold compensation operation, the engine control unit can control the heater 112 to inject additional heat energy into the exhaust gas flow, at a rate greater than that calculated herein as a difference between a target rate of heat energy and a rate of heat energy supplied by the diesel engine. This additional heat energy to be injected by the heater 112 may be calculated as a difference between the total amount of energy required to be provided by both the diesel engine and the heater 112 to raise the mid-bed temperature of the catalytic bed of the close-coupled SCR 116 from ambient temperature to the target temperature as discussed elsewhere herein (as determined, for example, in the laboratory experiments described herein and/or stored in the lookup table or database described herein) and the total energy already delivered to the exhaust gas flow by both the diesel engine and the heater 112, which may be calculated by computing an integral of the sum of the instantaneous power delivered by the heater 112 and a product of the measured mass flow rate of the exhaust gas flow, the molar specific heat of the exhaust gas flow, and the temperature ($T_1$) measured by the first temperature sensor 106 over time, so long as such a difference remains positive (that is, so long as excess heat energy is still required). That is, this additional heat energy may be calculated by subtracting the total energy already delivered to the exhaust gas flow from the total amount of energy required to be provided by both the diesel engine and the heater 112 to raise the mid-bed temperature of the catalytic bed of the close-coupled SCR 116 from ambient temperature to the target temperature.

A calculation of the total energy already delivered to the exhaust gas flow by both the diesel engine and the heater 112 may also be performed by summing an integral of the instantaneous power delivered by the heater 112 over time and an integral of a product of the measured mass flow rate of the exhaust gas flow, the molar specific heat of the exhaust gas flow, and the temperature ($T_1$) measured by the first temperature sensor 106 over time. The engine control unit can then operate the heater 112 to provide this additional heat energy to the exhaust gas flow as quickly as possible, such as by operating the heater 112 at its maximum capacity, or at 90%, 95%, 98%, or 99% of its maximum capacity, and continuing to perform the calculations described herein, until the total energy delivered to the exhaust gas flow from both the diesel engine and the heater 112 equals or exceeds the total amount of energy required to be provided to raise the mid-bed temperature of the catalytic bed of the close-coupled SCR 116 to the target temperature.

As noted elsewhere herein, the performance of the heater 112 may degrade over time. As one example, a resistance of a resistive heater may change over time. Thus, in order to ensure that the heater 112 is performing adequately, performance of the heater 112 may be monitored and degradation in performance may be compensated for. For example, the first temperature sensor 106 and the second temperature sensor 114 can be used to measure temperatures of the exhaust gas flow upstream and downstream, respectively, of the heater 112. Thus, by computing a difference between the measurements provided by the first and second temperature sensors 106 and 114, such as by subtracting one from the other, an actual change in temperature of the exhaust gas flow across the heater 112 can be determined. A rate at which the heater 112 is delivering heat energy to the exhaust gas flow (in units of power) may then be computed as the product of this change or difference in temperature, the mass flow rate of the exhaust gas flow, and the molar specific heat of the exhaust gas flow.

The engine control unit can also measure an amount of current being drawn by the heater 112. The engine control unit can therefore determine the resistance of the heater 112 from such information because it is known that the rate of heat energy supplied by a resistive heater (in units of power) is proportional to the product of its resistance and the square of the current it draws. The engine control unit can use this calculated resistance of the heater 112 to calculate a current to supply to the heater 112 going forward, such as by setting the current to be supplied to the heater 112 equal to the square root of the ratio of the rate of heat energy to be supplied to the exhaust gas flow (in units of power), as calculated as described elsewhere herein, to the resistance of the heater. The engine control unit can also include a failure detection mechanism that may determine that the heater 112 has failed if the resistance of the heater 112, as calculated as described herein, is outside of specified bounds for a specified period of time.

Figure 2:
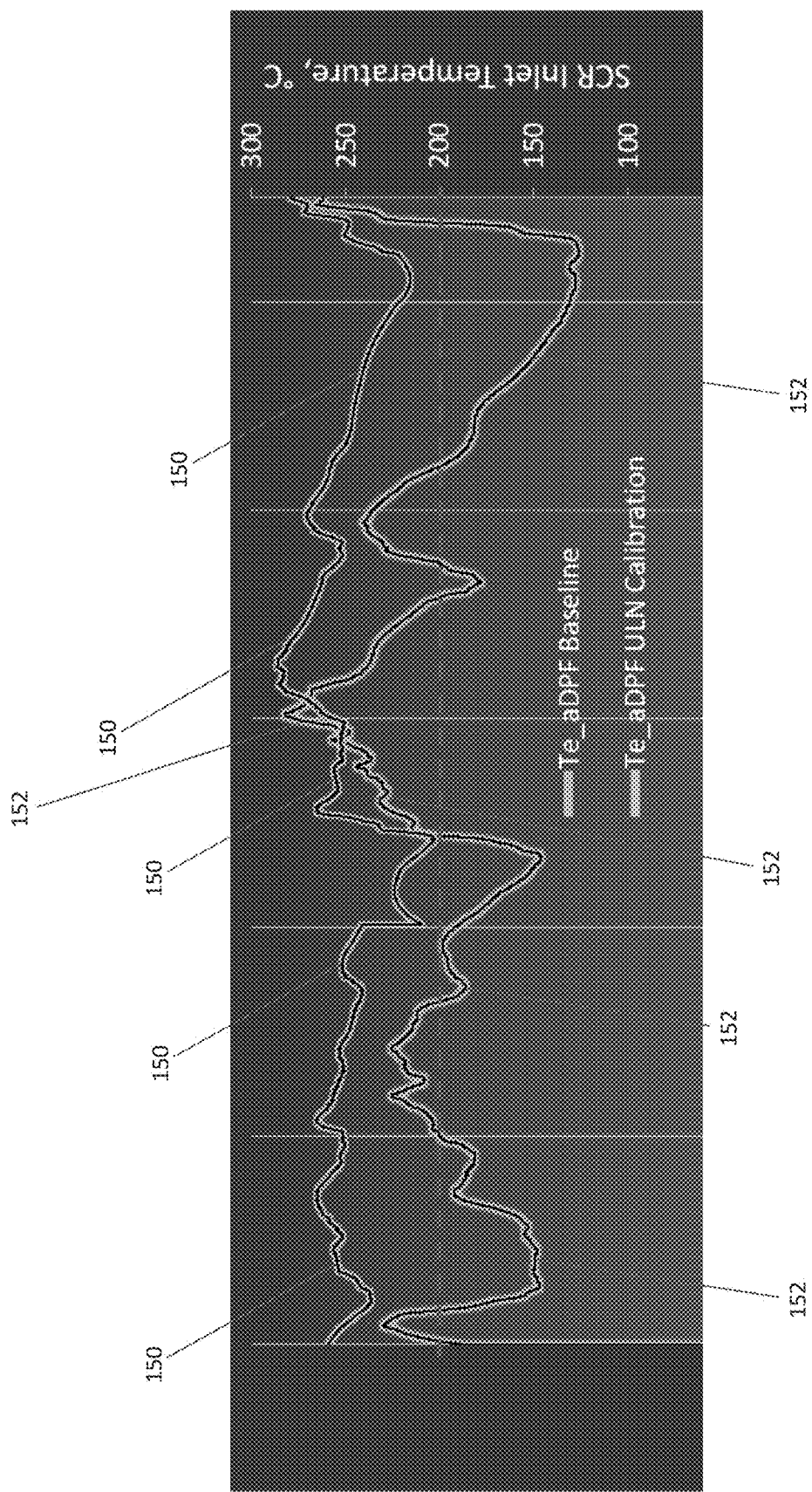
FIG. 2 illustrates results of experimental testing of a heavy-duty vehicle including a diesel engine and the exhaust after-treatment system of FIG. 1.

FIG. 2 illustrates results of experimental testing of a heavy-duty vehicle including a diesel engine and an exhaust after-treatment system similar to the exhaust after-treatment system 100. Specifically, FIG. 2 illustrates a chart of measured SCR inlet temperatures over time, both under baseline operations or operating conditions (that is, not performing the methods described herein) and under ultra-low $NO_x$ ("ULN") calibration operations or operating conditions (that is, performing the methods described herein). The chart of FIG. 2 includes a straight dashed line at the target temperature of 200 degrees Celsius for reference. The chart of FIG. 2 includes a first curve 150 illustrating measured temperatures under the ULN calibration conditions and a second curve 152 illustrating measured temperatures under the baseline conditions. As illustrated in FIG. 2, the ULN calibration conditions, using the techniques described herein, result in temperatures that more consistently remain above the target temperature threshold and that are more consistent or stable (that is, extend across a narrower band or range of temperatures). The fact that the temperatures more consistently remain above the target temperature means that $NO_x$ emissions will be lower than under the baseline conditions, and the greater consistency or stability of the temperatures means that an incurred fuel penalty will be smaller than under the baseline conditions.

Figure 3:
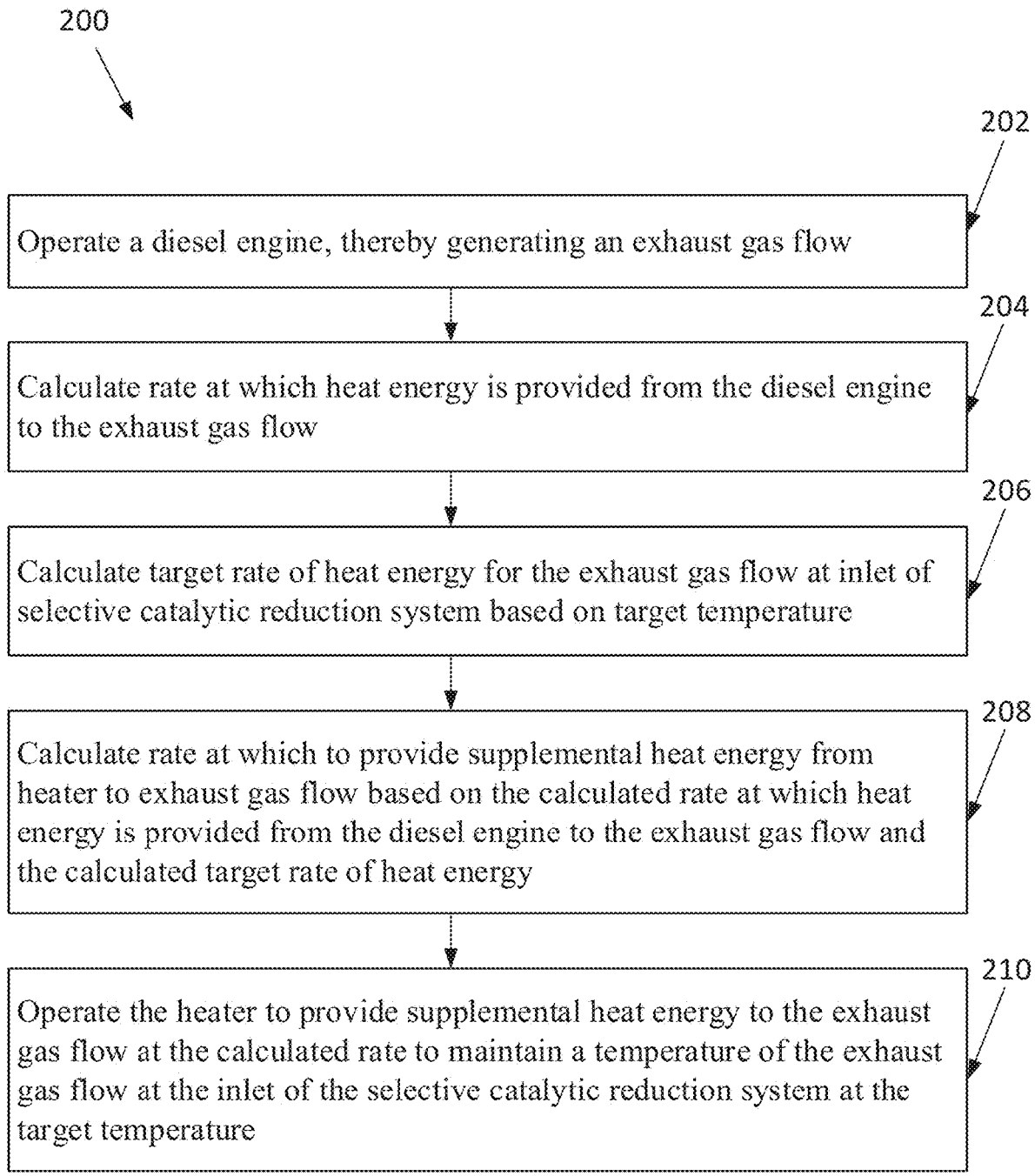
FIG. 3 illustrates a flow chart of a method of using the systems described herein.

FIG. 3 illustrates a flow chart 200 of a summarized version of a method in accordance with the present disclosure. As illustrated in FIG. 3, the method includes, at 202, operating a diesel engine, thereby generating an exhaust gas flow. The method further includes, at 204, calculating a rate at which heat energy is provided from the diesel engine to the exhaust gas flow, and at 206, calculating a target rate of heat energy for the exhaust gas flow at an inlet of a selective catalytic reduction system based on a target temperature. The method further includes, at 208, calculating a rate at which to provide supplemental heat energy from a heater to the exhaust gas flow based on the calculated rate at which heat energy is provided from the diesel engine to the exhaust gas flow and the calculated target rate of heat energy, and at 210, operating the heater to provide supplemental heat energy to the exhaust gas flow at the calculated rate to maintain a temperature of the exhaust gas flow at the inlet of the selective catalytic reduction system at the target temperature.

The description provided herein relates specifically to the heater 112, which is located just upstream of the first, close-coupled SCR 116. In some implementations, the second, underbody SCR 126 can be provided with an additional heater such that the additional heater has features with respect to the underbody SCR 126 that correspond to or match the features of the heater 112 with respect to the close-coupled SCR 116. In some implementations, the second, underbody SCR 126 and the additional heater can further be provided with additional temperature sensors such that the additional temperature sensors have features with respect to the underbody SCR 126 and the additional heater that correspond to or match the features of the first and second temperature sensors 106 and 114 with respect to the close-coupled SCR 116 and the heater 112. In such embodiments, the additional temperature sensors can have features corresponding to those described for the first and second temperature sensors 106 and 114, the additional heater can have features corresponding to those of the heater 112, and the underbody SCR 126 can have features corresponding to those of the close-coupled SCR 116.

In other embodiments, the exhaust after-treatment system 100 may include three, four, or any other number of independent SCR systems, together with respective heaters and temperature sensors. Each of the SCR systems and respective heaters and temperature sensors can have features corresponding to those described herein for the close-coupled SCR 116, the heater 112, and the first and second temperature sensors 106 and 114. In other embodiments, the exhaust after-treatment system 100 may include three, four, or any other number of independent heaters with respective temperature sensors. Each of the heaters and respective temperature sensors can have features corresponding to those described herein for the heater 112 and the first and second temperature sensors 106 and 114.

Embodiments described herein are described as being driven by the heat energy or temperature needs of a catalytic bed of an SCR system. In alternative embodiments, a target temperature or a target rate or level of energy (that is, a target power) may be determined with reference to any other component the operation of which is dependent upon temperature or heat energy or power levels. In any of the embodiments herein, a single heater, such as the heater 112, may be replaced with two or more individual or distinct heating units. In such embodiments, the plural heating units may be collectively considered as a single heater system corresponding to the heater 112. One of skill in the art would understand how to modify the calculations presented herein for use with plural individual or distinct heating units in place of the heater 112, such as by summing the heat energy supplied by the plural heating units determine an amount of heat energy supplied by the single heater system including the plural heating units.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    operating a diesel engine such that the diesel engine generates an exhaust gas flow, and
    while operating the diesel engine, operating an exhaust after-treatment system to control a temperature of the exhaust gas flow at a selective catalytic reduction system of the exhaust after-treatment system;
    wherein operating the exhaust after-treatment system includes:
        calculating a rate at which heat energy is provided from the diesel engine to the exhaust gas flow by averaging a product of a temperature of the exhaust gas flow as it enters the exhaust after-treatment system, a mass flow rate of the exhaust gas flow, and a molar specific heat of the exhaust gas flow across a moving average window of time,
        calculating a target rate of heat energy for the exhaust gas flow at the selective catalytic reduction system based on a target temperature of the exhaust gas flow at the selective catalytic reduction system,
        calculating a supplemental heat rate at which to provide supplemental heat energy from a heater of the exhaust after-treatment system to the exhaust gas flow based on the calculated rate at which heat energy is provided from the diesel engine to the exhaust gas flow and the calculated target rate of heat energy, and
        operating the heater to provide supplemental heat energy to the exhaust gas flow at the calculated supplemental heat rate.

2. The method of claim 1, wherein operating the exhaust after-treatment system to control the temperature of the exhaust gas flow at the selective catalytic reduction system of the exhaust after-treatment system includes maintaining the temperature at a constant target temperature.

3. The method of claim 2, wherein the constant target temperature is at least 200 degrees Celsius.

4. The method of claim 1, wherein calculating the target rate of heat energy for the exhaust gas flow at the selective catalytic reduction system includes averaging a product of the target temperature, a mass flow rate of the exhaust gas flow, and a molar specific heat of the exhaust gas flow across a moving average window of time.

5. The method of claim 1, wherein calculating the supplemental heat rate at which to provide supplemental heat energy from the heater includes subtracting the calculated rate at which heat energy is provided from the diesel engine to the exhaust gas flow from the calculated target rate of heat energy.

6. A method, comprising:
    operating a diesel engine such that the diesel engine generates an exhaust gas flow; and
    while operating the diesel engine, operating an exhaust after-treatment system to control a temperature of the exhaust gas flow at a selective catalytic reduction system of the exhaust after-treatment system;
    wherein operating the exhaust after-treatment system includes:
        calculating a rate at which heat energy is provided from the diesel engine to the exhaust gas flow,
        calculating a target rate of heat energy for the exhaust gas flow at the selective catalytic reduction system based on a target temperature by averaging a product of the target temperature, a mass flow rate of the exhaust gas flow, and a molar specific heat of the exhaust gas flow across a moving average window of time,
        calculating a supplemental heat rate at which to provide supplemental heat energy from a heater of the exhaust after-treatment system to the exhaust gas flow based on the calculated rate at which heat energy is provided from the diesel engine to the exhaust gas flow and the calculated target rate of heat energy, and
        operating the heater to provide supplemental heat energy to the exhaust gas flow at the calculated supplemental heat rate.

7. The method of claim 6, wherein operating the exhaust after-treatment system to control the temperature of the exhaust gas flow at the selective catalytic reduction system of the exhaust after-treatment system includes maintaining the temperature at a constant target temperature.

8. The method of claim 7, wherein the constant target temperature is at least 200 degrees Celsius.

9. The method of claim 6, wherein calculating the supplemental heat rate at which to provide supplemental heat energy from the heater includes subtracting the calculated rate at which heat energy is provided from the diesel engine to the exhaust gas flow from the calculated target rate of heat energy.

10. A method, comprising:
    operating a diesel engine such that the diesel engine generates an exhaust gas flow;
    while operating the diesel engine, operating an exhaust after-treatment system to control a temperature of the exhaust gas flow at a selective catalytic reduction system of the exhaust after-treatment system, wherein operating the exhaust after-treatment system includes:
    calculating a rate at which heat energy is provided from the diesel engine to the exhaust gas flow,
    calculating a target rate of heat energy for the exhaust gas flow at the selective catalytic reduction system based on a target temperature of the exhaust gas flow at the selective catalytic reduction system,
    calculating a supplemental heat rate at which to provide supplemental heat energy from a heater of the exhaust after-treatment system to the exhaust gas flow based on the calculated rate at which heat energy is provided from the diesel engine to the exhaust gas flow and the calculated target rate of heat energy,
    measuring a first temperature of the exhaust gas flow upstream of the heater;
    measuring a second temperature of the exhaust gas flow downstream of the heater;
    measuring a current drawn by the heater;

calculating an electric current to be supplied to the heater based on the measurements of the first temperature, the second temperature, and the drawn current, and the calculated supplemental heat rate at which to provide supplemental heat energy from the heater to the exhaust gas flow; and operating the heater to provide supplemental heat energy to the exhaust gas flow at the calculated supplemental heat rate, including supplying the calculated electric current to the heater.

11. The method of claim 10, wherein calculating the electric current to be supplied includes calculating an electric resistance of the electric heater.

12. The method of claim 11, further comprising detecting a failure of the heater based on the calculated electric resistance.

13. The method of claim 11, wherein calculating the electric resistance of the electric heater includes dividing a rate at which the heater delivers energy to the exhaust gas flow by a square of the current drawn by the heater.

14. The method of claim 11, wherein calculating the electric current further includes taking a square root of a ratio of the calculated supplemental heat rate at which the heater is to provide supplemental heat energy to the exhaust gas flow to the calculated resistance of the heater.

15. A method, comprising:

operating a diesel engine such that the diesel engine generates an exhaust gas flow; and while operating the diesel engine, operating an exhaust after-treatment system to increase a temperature of a catalytic bed of a selective catalytic reduction system of the exhaust after-treatment system; and while operating the diesel engine and after increasing the temperature of the catalytic bed of the selective catalytic reduction system, operating the exhaust after-treatment system to control a temperature of the exhaust gas flow at the selective catalytic reduction system;

wherein operating the exhaust after-treatment system to increase the temperature of the catalytic bed of the selective catalytic reduction system includes calculating a first rate at which heat energy is provided from the diesel engine to the exhaust gas flow, calculating a first target rate of heat energy for the exhaust gas flow at the selective catalytic reduction system based on a target temperature, calculating a first supplemental heat rate at which to provide supplemental heat energy from a heater of the exhaust after-treatment system to the exhaust gas flow based on the calculated first rate at which heat energy is provided from the diesel engine to the exhaust gas flow and the calculated first target rate of heat energy, and operating the heater to provide supplemental heat energy to the exhaust gas flow at a rate exceeding the calculated first supplemental heat rate;

wherein operating the exhaust after-treatment system to control the temperature of the exhaust gas flow at the selective catalytic reduction system includes calculating a second rate at which heat energy is provided from the diesel engine to the exhaust gas flow, calculating a second target rate of heat energy for the exhaust gas flow at the selective catalytic reduction system based on the target temperature, calculating a second supplemental heat rate at which to provide supplemental heat energy from a heater of the exhaust after-treatment system to the exhaust gas flow based on the calculated second rate at which heat energy is provided from the diesel engine to the exhaust gas flow and the calculated second target rate of heat energy, and operating the heater to provide supplemental heat energy to the exhaust gas flow at the calculated second supplemental heat rate.

16. The method of claim 15 wherein operating the exhaust after-treatment system to increase the temperature of the catalytic bed of the selective catalytic reduction system includes initiating operation of the exhaust after-treatment system to increase the temperature of the catalytic bed of the selective catalytic reduction system upon determining that a temperature of an engine coolant is below a threshold temperature.

17. The method of claim 15 wherein operating the exhaust after-treatment system to increase the temperature of the catalytic bed of the selective catalytic reduction system includes halting operation of the exhaust after-treatment system to increase the temperature of the catalytic bed of the selective catalytic reduction system upon determining that a temperature of an engine coolant is above a threshold temperature.

18. The method of claim 15 wherein operating the heater to provide supplemental heat energy to the exhaust gas flow at the rate exceeding the calculated first supplemental heat rate includes operating the heater to provide supplemental heat energy to the exhaust gas flow at the rate exceeding the calculated first supplemental heat rate until a total heat energy delivered to the exhaust gas flow by both the diesel engine and the heater exceeds a total heat energy required to be delivered to the exhaust gas flow by both the diesel engine and the heater to raise the temperature of the catalytic bed of the selective catalytic reduction system by a target temperature difference.

19. The method of claim 15 wherein operating the heater to provide supplemental heat energy to the exhaust gas flow at the rate exceeding the calculated first supplemental heat rate includes operating the heater at greater than 99% of its maximum capacity.

* * * * *